UNITED STATES PATENT OFFICE.

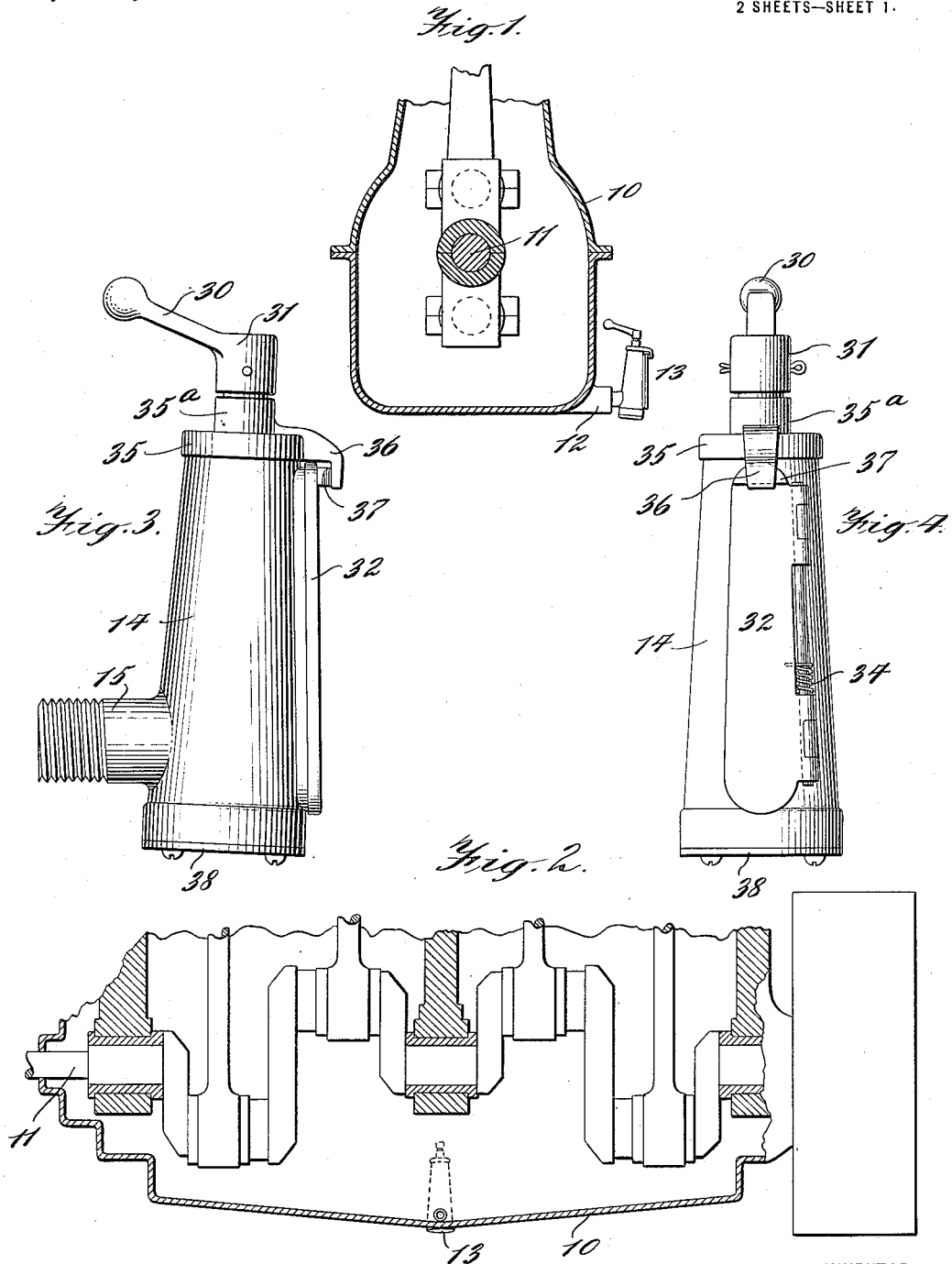

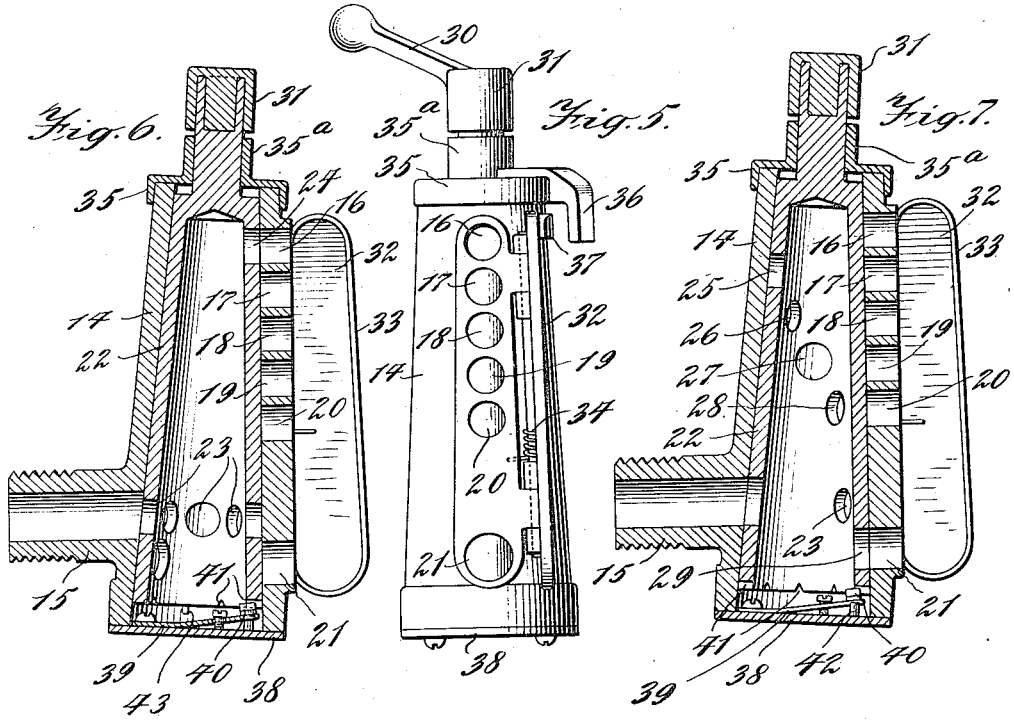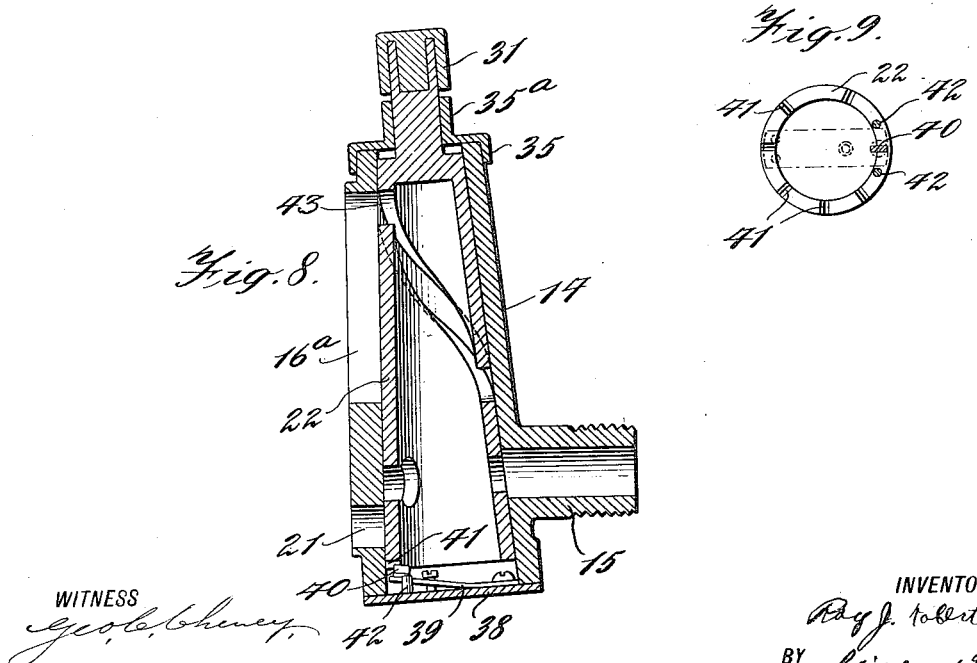

ROY J. ROBERTSON, OF BROOKLYN, NEW YORK.

LEVEL-INDICATOR FOR LUBRICATING SYSTEMS.

1,285,393.        Specification of Letters Patent.        Patented Nov. 19, 1918.

Application filed June 8, 1918. Serial No. 239,065.

*To all whom it may concern:*

Be it known that I, ROY J. ROBERTSON, a citizen of the United States, residing at Brooklyn, in the county of Kings and State of New York, have invented certain new and useful Improvements in Level-Indicators for Lubricating Systems, of which the following is a specification.

My invention relates to new and useful improvements in level indicators for lubricating systems, wherein the system is provided with a reservoir for the lubricating oil, and particularly applicable to the lubricating systems of internal combustion engines wherein the crank case of the engine serves as a reservoir for the lubricant. The invention is equally applicable to gas and lubricating systems known as splash systems, wherein the oil supply which is confined in the crank case is agitated by the movement of the engine parts located in the crank case; to circulatory systems wherein the crank case serves as a reservoir for the lubricating oil which is pumped by suitable means from the crank case to the moving parts of the engine, from which it returns to the crank case, which systems are commonly known as circulatory systems; or to a system which may be a combination of the splash and circulatory system.

The primary object of the invention is to provide a level indicator which will at all times be available to indicate approximately the exact level of oil in a crank case, by rendering possible a flow of oil at or from the indicator corresponding to the level of the oil in the crank case. A further object of the invention is to provide an indicator which will not only serve to indicate approximately the correct level of the oil within the crank case, but which may also be utilized to drain the crank case of its contents, either in entirety, or of any water or sediment which may collect in the bottom of the crank case.

My invention will best be understood by reference to the accompanying drawings in which, Figure 1 is a side elevation of an indicator embodying my invention applied to the crank case of an automobile, the latter being shown in section.

Fig. 2 is a longitudinal sectional view of the crank case, and showing the indicator in dotted lines.

Fig. 3 is a side elevation of the indicating device.

Fig. 4 is a side view taken at right angles to that shown in Fig. 3.

Fig. 5 is a side view showing the dust guard in open position.

Fig. 6 is a vertical section through the indicator, also showing the dust guard in open position.

Fig. 7 is a similar view showing the valve in a different position from that shown in Fig. 6.

Fig. 8 is a sectional view of a slightly modified form of indicator, and

Fig. 9 is a bottom plan view of the valve with a coöperating spring pressed pawl.

Referring now to the drawings, 10 is a crank case within which is mounted a crank shaft 11. It is to be understood that the crank case of an automobile ordinarily serves as a receptacle for the oil. A pipe connection 12 communicates with the crank case at its lowest portion, as indicated in Fig. 1. The device 13 embodying my invention, comprises a hollow valve casing 14, which is preferably conical in form, provided with a threaded nipple 15, which engages an interior threaded part (not shown) of the pipe connection 12. The valve casing is provided with one or more openings, which in Fig. 6 are indicated as five in number, but which in the modification shown in Fig. 8, is a single opening. These openings are indicated in Fig. 6 by the reference numerals 16, 17, 18, 19 and 20, and are preferably arranged one above the other. An additional opening 21 is also preferably provided and located at a lower level than the openings 16, 17, 18, 19 and 20.

A valve member 22, also conical in form, is seated within the valve casing 14, and is provided with an annular series of openings 23 arranged to register successively with the opening in the nipple 15. The valve 22 is provided with a series of openings 24, 25, 26, 27 and 28 arranged in the form of a spiral, so that as the valve is rotated, the openings 24, 25, 26, 27 and 28 are successively brought into registry with the openings 16, 17, 18, 19 and 20 respectively, the openings 24 and 16 being the first to be brought into registry. An additional opening 29 disposed in the lower portion of the valve 22 is arranged to register with the opening 21 of the valve casing in the final operating position of the valve.

The valve is operated by a handle 30 secured by means of a hub 31 to the shank of the valve member.

In order to exclude dust and other foreign matter from the openings of the valve casing when the device is not in operation, a pivoted dust guard 32 is provided, which may be formed with a flange 33, fitting over the edges of the raised portion of the valve casing in which the openings 16, 17, 18, 19 and 20 are formed. The dust guard is preferably biased to the open position by means of a spring 34. A hood 35 is mounted on the top of the valve casing, and is provided with a collar 35$^a$ which closely surrounds the shank of the valve member and is secured thereto. The hood is provided with a lug 36 which engages a cam member 37 at the upper end of the dust guard and, when in the closed position maintains the dust guard closed.

The bottom of the valve casing may be closed by a removable member 38 on the inner face of which is secured a spring member 39, to the outer end of which is attached a detent member 40, which engages a series of notches 41 formed in the lower edge of the valve 22. These notches are alined vertically with the spiral openings 24, 25, 26, 27 and 28 of the valve member, and the engagement of the detent with the notches retains the valve member in the various positions to which it has been moved. One or more lugs 42 are preferably mounted on the inside of the cover 38 which engage the spring member 39 laterally, thus preventing the valve member from making a complete revolution, and thereby insuring the valve being operated in the proper direction.

It will, of course, be understood that the liquid level within the valve is the same as that in the crank casing. In order to determine the level of the liquid in the crank casing, the operator turns the valve, as viewed in Figs. 3 and 4, in an anti-clockwise direction. As soon as the lug 36 is disengaged from the cam 37, the dust guard is opened by the spring 34, thus bringing into view the series of openings 16, 17, 18, 19 and 20 as viewed in Figs. 5 and 6. The uppermost opening 24 of the valve is first brought into registry with the opening 16 of the valve casing. If the oil within the crank casing is at or above the level of the opening 24, the oil will flow through the openings 24 and 16, and thus afford an indication to the operator that the oil is at or above this level. If no oil appears, the valve is further rotated, bringing the spiral openings of the valve member successively into registry with the openings of the valve casing, until oil does appear, the opening through which the oil flows thus affording an indication of the oil level in the crank casing.

The two bottom openings 21 and 29 of the valve casing and of the valve, respectively, are particularly intended for draining either water or oil, or both, from the crank casing. In the operation of an automobile, water accumulates for various reasons in the valve casing, and by moving the valve to the last position, the water alone, which settles to the bottom of the casing may be tapped from the casing, or the oil and the water, as desired.

In Fig. 8 I have shown a modification of my invention, in which a spiral opening 43 is provided in the valve 22, instead of a series of openings arranged spirally, and a single vertical opening 16$^a$ is provided in the valve casing 14. It will be apparent that when the valve member is turned in the manner similar to that described in connection with Figs. 5 and 7, the upper end of the spiral groove 43 will first be brought into registry with the opening 16$^a$. To determine the liquid level in the oil receptacle, the valve will be rotated until oil flows through the spiral opening 43. It will, of course, be obvious that when in the claims I refer to an opening in the valve casing, that I intend to cover either the single opening, as shown in Fig. 8, or the series of openings, as shown in Figs. 5 to 7.

While in accordance with the patent statutes I have shown my invention embodied in concrete form, it will be understood that my invention is not to be limited to the form there shown, and that the same may be carried out by other means.

What I claim and desire to secure by Letters Patent of the United States is:

1. In combination, a liquid reservoir, a liquid indicator therefor comprising a casing provided with an opening, and a valve member communicating with said reservoir and rotatably seated within said casing, said valve member being provided with a plurality of openings successively registering with the opening of the casing as the valve is rotated.

2. In combination, a liquid reservoir, a liquid indicator therefor comprising a casing provided with an opening, and a valve member communicating with said reservoir and rotatably seated within said casing and provided with a plurality of spirally arranged openings successively registering with the opening of the casing as the valve is rotated.

3. In combination, a liquid reservoir, a liquid indicator therefor comprising a casing provided with an opening, a valve member communicating with said reservoir rotatably seated within said casing and provided with a plurality of openings successively registering with the opening of the casing as the valve is rotated, and means for locking said valve member in the various registering positions.

4. In combination, a liquid reservoir, a liquid indicator therefor comprising a casing provided with an opening, a valve member communicating with said reservoir rotatably seated within said casing and provided with a plurality of openings successively registering with the opening of the casing as the valve is rotated, a dust guard for covering the opening of the valve casing, and means responsive to the rotation of the valve member for opening the dust guard.

5. In combination, a liquid reservoir, a liquid indicator therefor comprising a casing provided with an opening, a valve member communicating with said reservoir rotatably seated within said casing and provided with a plurality of openings successively registering with the opening of the casing as the valve is rotated, a dust guard for covering the opening of the casing and means for opening the dust guard, and means for successively bringing the openings of the valve into register with the opening of the casing.

6. In an indicator for liquid levels, an upright casing having an inlet at its lower portion, and means for permitting flow therefrom at different levels, a hollow valve rotatably mounted in the casing and communicating with said inlet, said valve having means whereby corresponding levels therein may communicate with said means for permitting flow from said casing.

In testimony whereof I have hereunto signed my name in the presence of two subscribing witnesses.

ROY J. ROBERTSON.

Witnesses:
ADELE S. EBERHARDT,
DANN L. WOOD.